US008069445B2

(12) United States Patent
Ma (10) Patent No.: US 8,069,445 B2
(45) Date of Patent: Nov. 29, 2011

(54) METHOD AND APPARATUS FOR DETECTING LOCK ACQUISITION HIERARCHY VIOLATIONS AND UNSAFE LOCK RELEASES

(75) Inventor: Zhiqiang Ma, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1475 days.

(21) Appl. No.: 11/480,141

(22) Filed: Jun. 30, 2006

(65) Prior Publication Data

US 2008/0005742 A1 Jan. 3, 2008

(51) Int. Cl.
*G06F 9/455* (2006.01)
*G06F 9/46* (2006.01)
*G06F 15/173* (2006.01)

(52) U.S. Cl. ............ 718/104; 178/1; 178/100; 709/226
(58) Field of Classification Search ........................ None
See application file for complete search history.

(56) References Cited

U.S. PATENT DOCUMENTS

| | | | | |
|---|---|---|---|---|
| 4,249,241 A * | 2/1981 | Aberle et al. | ................. | 710/200 |
| 4,791,554 A * | 12/1988 | Hirota et al. | ............................ | 1/1 |
| 5,202,990 A * | 4/1993 | Saikawa | ........................ | 710/200 |
| 5,414,839 A * | 5/1995 | Joshi | ...................................... | 1/1 |
| 5,682,530 A * | 10/1997 | Shimamura | ................... | 718/104 |
| 6,343,339 B1 | 1/2002 | Daynes | | |
| 6,374,285 B1 | 4/2002 | Scales et al. | | |
| 6,593,940 B1 * | 7/2003 | Petersen et al. | ............... | 715/700 |
| 6,748,470 B2 * | 6/2004 | Goldick | ........................ | 710/200 |
| 6,898,791 B1 * | 5/2005 | Chandy et al. | ................. | 719/314 |
| 6,976,107 B2 | 12/2005 | Limoges et al. | | |
| 7,251,814 B2 | 7/2007 | Armstrong et al. | | |
| 2003/0041090 A1 | 2/2003 | Armstrong et al. | | |
| 2003/0101300 A1 * | 5/2003 | Goldick | ........................ | 710/200 |
| 2005/0055593 A1 | 3/2005 | Shah et al. | | |
| 2005/0081204 A1 | 4/2005 | Schopp | | |
| 2006/0070076 A1 | 3/2006 | Ma | | |
| 2007/0143766 A1 * | 6/2007 | Farchi et al. | .................. | 718/104 |

OTHER PUBLICATIONS

Office Action for U.S. Appl. No. 11/473,580 dated Oct. 26, 2010, 15 pages.
Office Action for US. Appl. No. 11/473,580 dated Mar. 28, 2011, 15 pages.
Anderson, Thomas E., Anderson, Thomas E., "The Performance of Spin Lock Alternatives for Shared-Memory Multiprocessors," IEEE Transactions on Parallel and Distributed Systems, vol. 1, No. 1, pp. 6-16, Jan. 1990.
Mellor-Crummey, J.M., et al., Mellor-Crummey, J.M., et al., "Algorithms for Scalable Synchronization on Shared-Memory Multiprocessors," pp. 1-41, Jan. 1991.

* cited by examiner

*Primary Examiner* — Meng An
*Assistant Examiner* — Abdullah Al Kawsar
(74) *Attorney, Agent, or Firm* — Blakely, Sokoloff, Taylor & Zafman LLP (57) ABSTRACT

A thread analysis tool records a set of currently-held synchronization objects and currently-acquired objects when a thread acquires one or more objects, then searches for a lock acquisition hierarchy violation that may cause program deadlock. If a violation is found, it is reported to the user. Software to implement the methods of the analysis tool, and systems using the methods, are also described and claimed.

18 Claims, 10 Drawing Sheets

* "Common" resources are those acquired by the cross node and the ancestor, and also in the Held set of the "from" node.

METHOD AND APPARATUS FOR DETECTING LOCK ACQUISITION HIERARCHY VIOLATIONS AND UNSAFE LOCK RELEASES

FIELD

The invention relates to synchronization in multithreaded programs. More specifically, the invention relates to detecting synchronization-related programming errors in multithreaded programs.

BACKGROUND

Multiprocessing execution environments, where several independent sequences of instructions execute concurrently within separate or shared memory spaces, support a powerful paradigm for attacking many types of computational problems and for using multiprocessor systems efficiently. The threads of a multithreaded program, and cooperating processes that do not have the shared memory space that characterizes threads, often need to synchronize their activities to ensure correct operation. The synchronization is usually accomplished through operations on synchronization primitives, also called synchronization objects or synchronization resources ("resources" in short) provided by an operating system or other execution environment. Mutexes, semaphores, and events are examples of synchronization primitives or resources that provide various synchronization semantics.

Analyzing the operation of a multithreaded program can be a daunting task. Developing, extending and debugging a complex application may be difficult because of intricate relationships between the synchronization operations of various threads. Furthermore, because the precise order of thread operations may vary from run to run and from system to system, synchronization errors (which often manifest as deadlocks or "hangs") may not occur frequently enough to identify and correct the underlying error.

A method of detecting potential synchronization errors even when no actual deadlock occurs may serve as the basis of a useful analytical tool for software developers.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of this invention are similar to methods disclosed in U.S. Pat. No. 7,657,894 by the same inventor, but are able to detect additional classes of synchronization errors that are not detected by the earlier methods. Furthermore, embodiments of this invention may use fewer system resources (e.g. memory) during operation.

Figure 1:
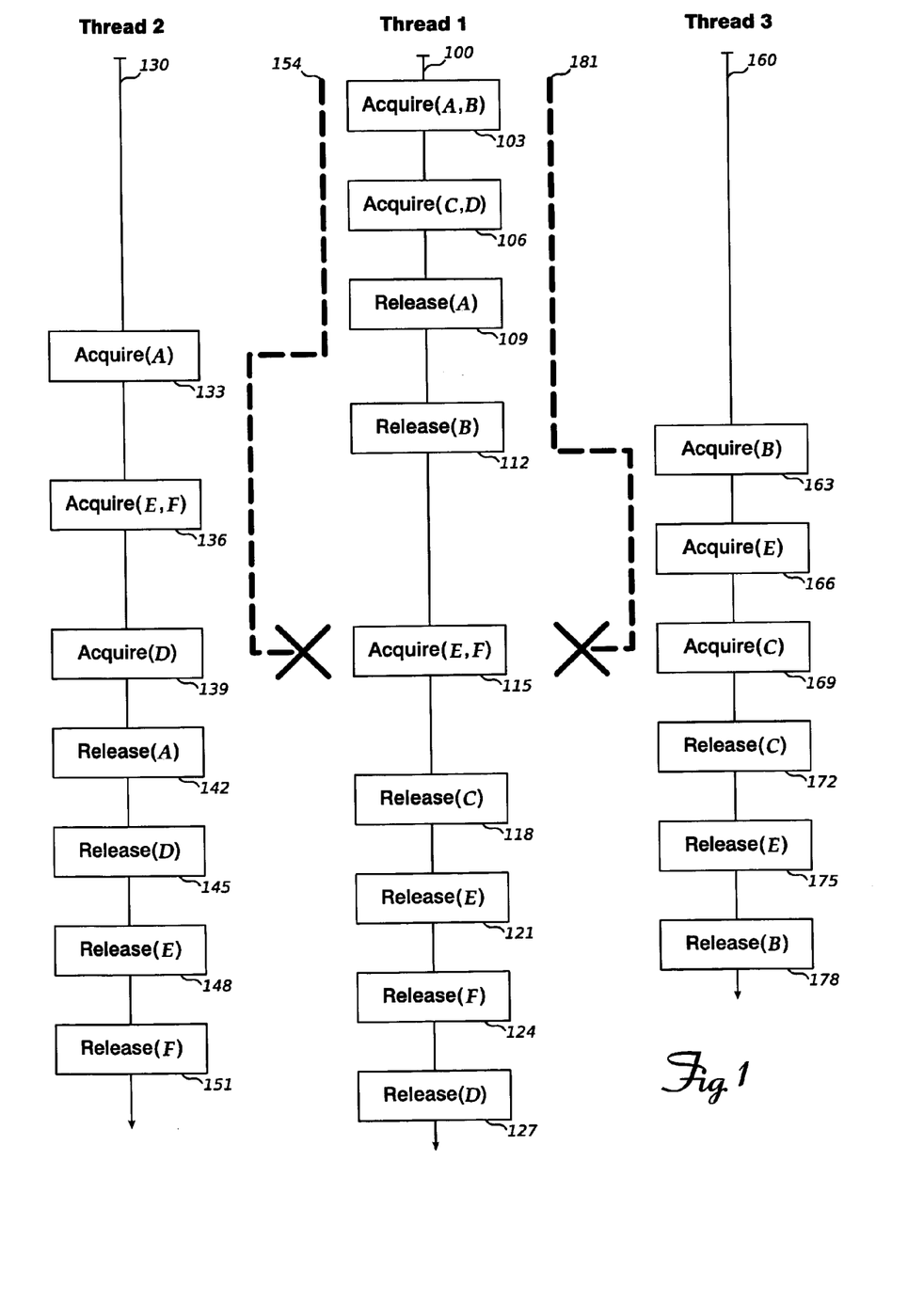
FIG. 1 shows sample synchronization operation sequences that may be performed by threads in a multi-threaded program.

FIG. 1 shows synchronization operations performed by three threads in a multithreaded application. Embodiments of the invention are only concerned with the ordering of synchronization operations, so other work performed in each thread before and between synchronizations is not shown.

Thread 1 100 performs a synchronization operation "Acquire" on synchronization objects A and B (103). (Embodiments of the invention generally need not distinguish between the various types of synchronization objects that may be available in an execution environment. For example, constructs to provide different synchronization semantics may be known as "locks," "mutexes," "semaphores," or "events." Furthermore, the synchronization operations will be referred to herein as "acquire," "get" or "lock;" and "relinquish," "release" or "unlock," although certain synchronization objects may customarily use specialized terms for the corresponding operations. For example, semaphore object operations are sometimes referred to as "Down" and "Up" instead of "Lock" and "Unlock.") Then, thread 1 acquires C and D (106). Next, it releases ("relinquishes" or "unlocks") A (109) and then releases B (112). Later, it acquires E and F (115), then releases C (118), E (121), F (124) and D (127) in that order. (These synchronization operations are selected and ordered to illustrate the class of programming error that can be detected by embodiments of the invention. The operations seem nonsensical when presented in this linear form, but the sequence might nevertheless occur when the thread uses various libraries and subroutines to perform sub-portions of its work.)

Thread 2 130 acquires A (133), then acquires E and F (136), and finally acquires D (139). Later, the synchronization objects are released in the order A (142), D (145), E (148) and F (151). Under many execution schedulings, Threads 1 and 2 can operate normally and run to completion. However, if the threads happen to be scheduled as shown by dashed line 154, they will deadlock. The potential for deadlock between Thread 1 100 and Thread 2 130 arises because the lock acquisition hierarchy established by one thread is violated by the other thread. Specifically, Thread 1 establishes a (partial) acquisition hierarchy "acquire D before acquiring (E,F)," while Thread 2 acquires (E,F) before acquiring D. Therefore, a deadlock is possible. The violation is caused by the unsafe lock release performed by Thread 1 at 109. If Thread 1 did not release A before acquiring (E,F), then A would dominate both D and (E,F) ("acquire A before acquiring (E,F); acquire A before acquiring D") in the hierarchies established by both Thread 1 and Thread 2, and it would be impossible for a deadlock to occur here. The method disclosed in U.S. Pat. No. 7,657,894 will detect the lock acquisition hierarchy violation, but cannot identify the unsafe lock release at 109 that causes the violation. Note that lock acquisition hierarchy violations and unsafe lock releases are separate but related issues. A lock acquisition hierarchy violation may or may not be due to an unsafe lock release, and an unsafe lock release may or may not result in a hierarchy violation. However, a potential deadlock is always signaled by one or more lock acquisition hierarchy violations.

Embodiments of the invention can also detect another type of unsafe lock release that poses no risk of deadlock to the current program, but instead is a latent error that may be triggered by future program additions or modifications. Thread 1's release of primitive B at 112 is such an unsafe lock release.

To see how Release(B) at 112 can cause deadlock, consider the program's operation if Thread 3 160 is added. Thread 3 performs the following sequence of synchronization operations: Acquire(B) (163), Acquire(E) (166), Acquire(C) (169), Release(C) (172), Release(E) (175), and Release(B) (178). However, if the threads are scheduled as shown by dashed line 181, they will deadlock when Thread 1 tries to acquire E and F (115) while holding C and D, and Thread 3 tries to acquire C (169) while holding E.

Methods according to an embodiment of the invention, as described below, detect lock acquisition hierarchy violations and unsafe lock releases even if no deadlock occurs on a program run. Lock acquisition hierarchy violations and unsafe lock releases can be identified even if the program appears to run correctly whenever it is tested. This is important because multithreaded programs may be sensitive to system and environmental factors such as the number and speed of processors in a system, the amount of memory available, and the number of interrupts or other system load factors. It is often difficult for debugging engineers to reproduce a deadlock seen at a deployed system when the test system is even slightly different from the production system.

Figure 2:
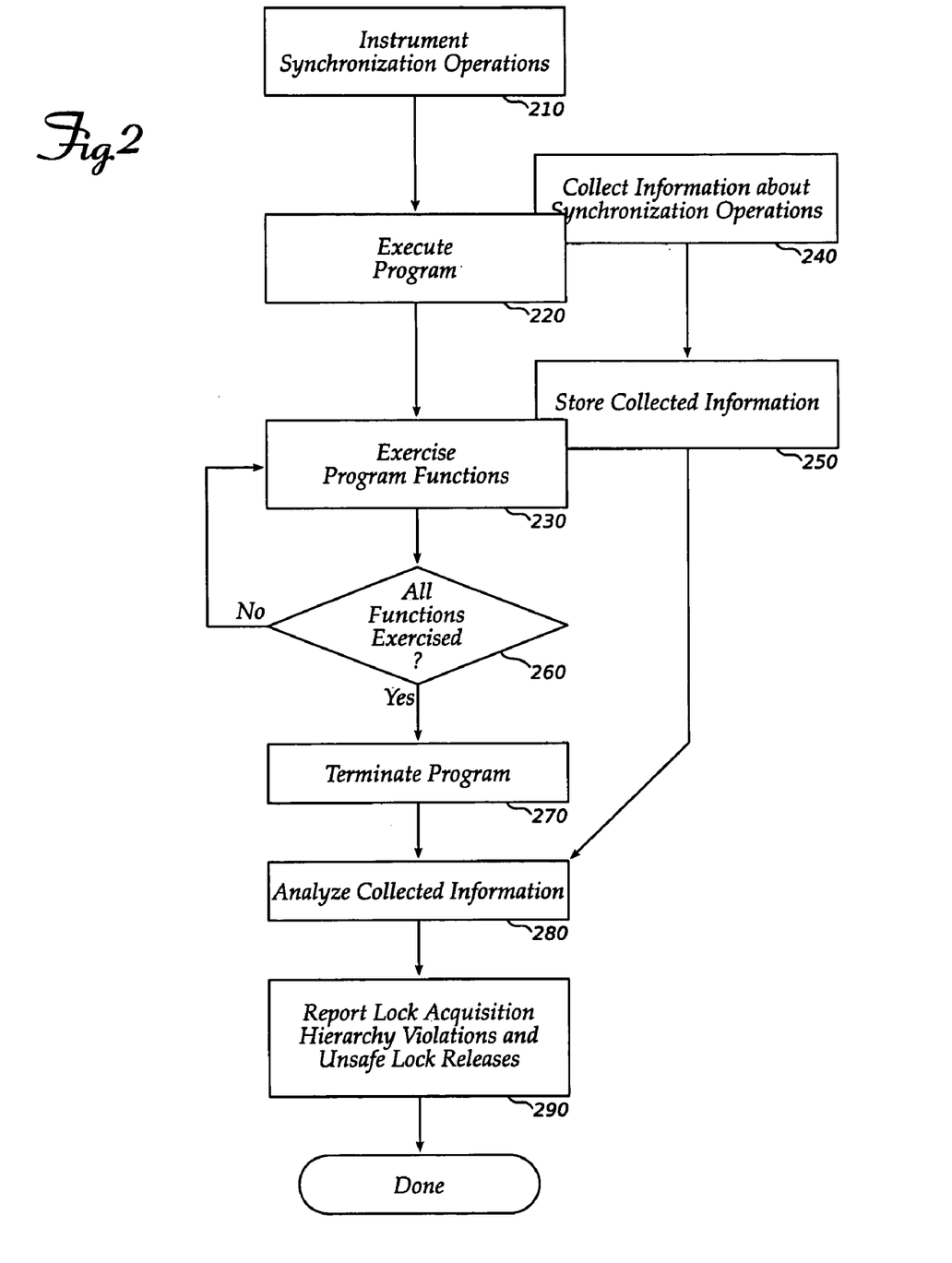
FIG. 2 outlines a method of an embodiment of the invention.

FIG. 2 provides an overview of the operation of some embodiments of the invention. Embodiments operate by collecting data about a program's synchronization operations and analyzing that data to detect lock acquisition hierarchy violations and unsafe lock releases. One way of collecting the necessary data is to instrument the synchronization operations of the program (210). To "instrument" a program is to add instructions that collect the desired information. A program may be instrumented at compile time by inserting the data collection instructions directly into the sequence of instructions emitted to perform the program's normal functions; or at run time, by replacing a library containing normal synchronization subroutines with a second library that contains modified versions of the same subroutines, where the modification includes collecting the information of interest.

Next, the instrumented program is executed (220) and its functions are exercised (230). During these operations, data about synchronization operations of each thread are collected by the instrumentation code (240) and may be stored periodically for later analysis (250). The collection and storage of instrumentation data are shown "behind" the main operations because the instrumentation instructions are preferably designed to disturb the program's normal operations as little as possible. However, as noted above, lock acquisition hierarchy violation and unsafe lock release detection according to embodiments of the invention does not depend on the occurrence of a deadlock during the execution of the program. In fact, an unsafe lock release will always occur before the deadlock (if the deadlock ever occurs). Embodiments can detect lock acquisition hierarchy violations and potentially unsafe lock releases near the time of the offending operation, and may be operated to produce warnings about lock acquisition hierarchy violations and potentially unsafe lock releases.

If all functions of the instrumented program have been exercised (260), its operation may be terminated (270) and the collected data analyzed (280). Alternatively, the collected data may be analyzed while the instrumented program is executing (not shown).

Analysis of the collected synchronization data identifies lock acquisition hierarchy violations and unsafe lock releases that occurred during the program's execution. An embodiment may produce a report listing the locations in the original program where incorrect or unsafe operations were performed (290). The listing may include an explanation to show what synchronization operation sequence caused the identified lock acquisition hierarchy violations and what synchronization operation sequence caused the identified lock releases to be unsafe.

Figures 3A, 3B:
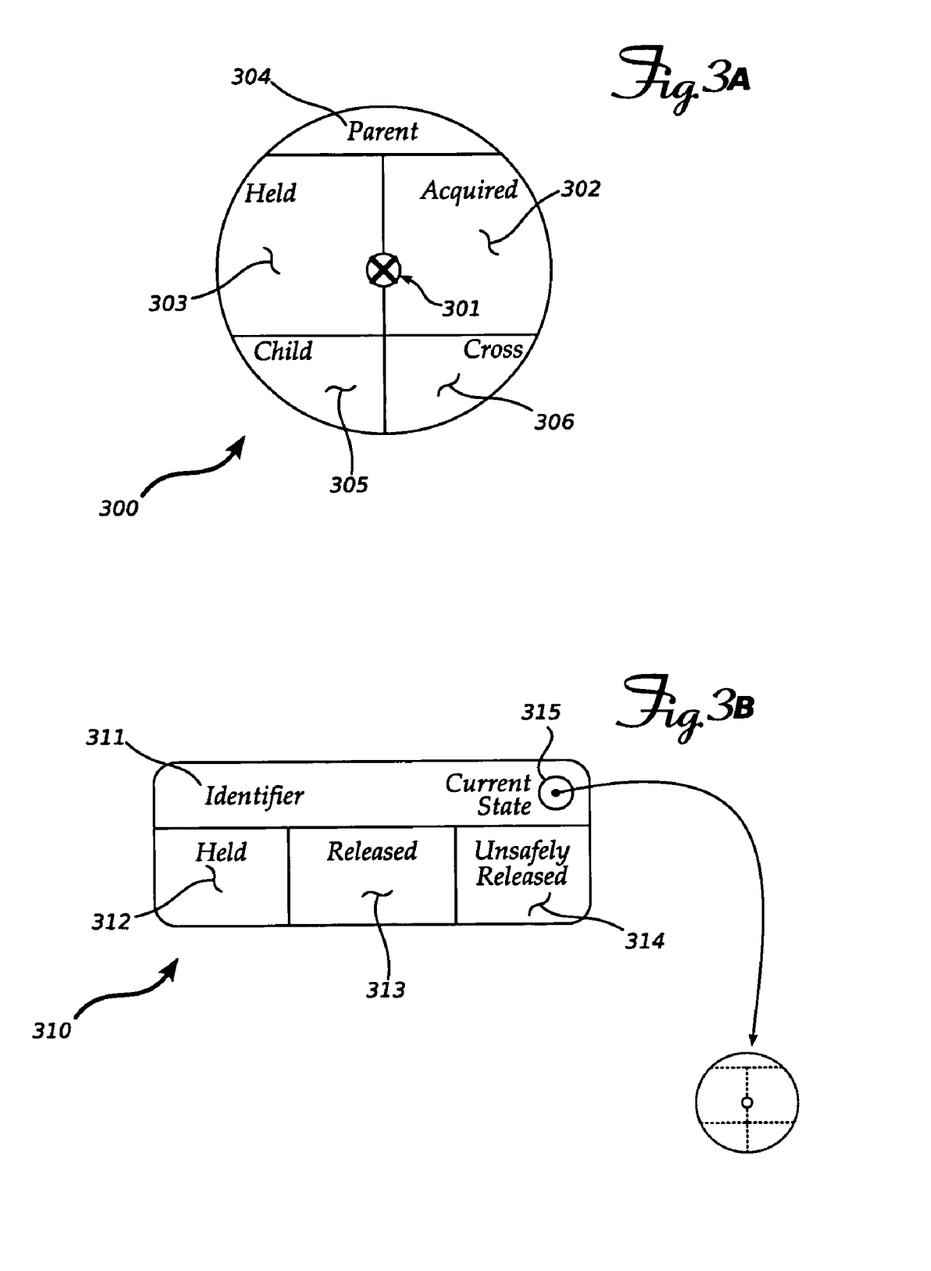
FIGS. 3A and 3B describe data structures that can support the analysis performed by embodiments.

Operations of embodiments of the invention can best be understood by considering the data structures and manipulations performed by the collection and analysis software in a canonical embodiment. FIG. 3A shows a node 300 of a graph structure that may be used to collect and analyze data to identify lock acquisition hierarchy violations and unsafe lock releases. Each node represents an acquisition of a set of resources (synchronization objects) made by a thread while holding another set of resources. Nodes are connected by edges that indicate ordering relations to immediately preceding resource acquisitions and immediately succeeding resource acquisitions. Each node has a mark 301, two sets of resources (Acquired 302 and Held 303), and three types of links: one Parent link 304, zero or more Child links 305, and zero or more Cross links 306. The Acquired set contains the identifiers of synchronization objects acquired on entry to the synchronization state, and the Held set contains the identifiers of synchronization objects held by the thread when the acquisition is performed. In the following discussion, if v denotes a node, then the elements of v will be identified as v.Mark, v.Held, v.Acquired, and so forth.

The Parent, Child and Cross links of a node are maintained as follows: if there is no synchronization object acquisition before acquisition v is performed, then v.Parent is nil (the node has no parent). If acquisition u was performed before v, then u will be present in the graph. If v.Held is not empty, then v.Parent=u and u.Child includes v (v∈u.Child). Otherwise, if v.Held is empty, then v.Parent is nil and v∉u.Child. Finally, for any node w in the graph, if w.Acquired ∩ v.Acquired≠∅ (for w≠v), then w has a cross link to v: v∈w.Cross if v.Parent≠∅, and v has a cross link to w: w∈v.Cross if w.Parent≠∅. An embodiment of the invention can set or clear the Mark field to mark or unmark a node. This permits a graph analysis routine to keep track of graph nodes that it has already processed. Nodes as described herein and depicted in FIG. 3A represent resource acquisitions, not the resources themselves. The Acquired and Held sets and the three kinds of links (Parent, Child and Cross) precisely describe each resource acquisition and its ordering relationships to immediately preceding and immediately succeeding acquisitions.

FIG. 3B shows a second data structure 310 that contains information about each thread executing in the program being examined. The thread descriptor contains a unique identifier of the thread 311 and three sets of resources: Held 312, Released 313, and UnsafelyReleased 314. These three sets contain identifiers of the synchronization objects currently held by the thread, synchronization objects that have been released by the thread, and synchronization objects that may have been released unsafely by the thread. Each thread descriptor also contains a Current State link 315 to a node such as that shown in FIG. 3A, in the graph structure, that identifies the current synchronization state of that thread. If T denotes a thread descriptor, then the elements of T will be identified as T.Id, T.Held, T.Released, T.UnsafelyReleased and T.Current.

When the program being examined starts, the graph structure is empty, the thread descriptor resource sets are all empty, and the thread's Current State link is nil. Listing 1 is a pseudo-code description of a process for constructing and maintaining the graph of synchronization primitive acquisitions ("G") and associated thread descriptors.

Listing 1

```
10   WHILE (true) DO {
20     IF (thread t has acquired a set of resources s) THEN {
30       FOR (each resource r ∈ t.UnsafelyReleased) DO
40         report unsafe lock release of resource r;
50       t.UnsafelyReleased = Ø;
60       IF (t.Held == Ø) THEN {
70         node u = NIL;
80         FOR (each node v in G) DO {
90           IF (v.Parent == NIL AND v.Acquired == s) THEN {
100            u = v;
110            BREAK;
120          }
130        }
140        IF (u == NIL) THEN {
150          create node u;
160          u.Mark = UNMARKED;
170          u.Acquired = s;
180          u.Held = t.Held;
190          u.Parent = NIL;
200          FOR (each node w (≠ u) in G) DO {
210            IF (w.Parent ≠ NIL AND
220                w.Acquired ∩ u.Acquired ≠ Ø) THEN
230              create one u.Cross = w;
240          }
250        }
260        t.Current = u;
270      } ELSE {
280        node u = NIL;
290        node p = t.Current;
300        FOR (each node v that p.Child links to) DO {
310          IF (v.Acquired == s AND v.Held == t.Held) THEN {
320            u = v;
330            BREAK;
340          }
350        }
360        IF (u == NIL) THEN {
370          create node u;
380          u.Mark = UNMARKED;
390          u.Acquired = s;
400          u.Held = t.Held;
410          u.Parent = p;
420          create one p.Child = u;
430          FOR (each node w (≠ u) in G) DO {
440            IF (w.Acquired ∩ u.Acquired ≠ Ø) THEN {
450              create one w.Cross = u;
460              IF (w.Parent ≠ NIL) THEN
470                create one u.Cross = w;
480            }
490          }
500          CALL LockAcquisitionHierarchyViolationDetector( u );
510        }
520        t.Current = u;
530      }
540      t.Held = t.Held ∪ s;
550    }
560    IF (thread t has released a set of resources s) THEN {
570      node p = t.Current;
580      FOR (each resource r ∈ s) DO {
590        IF (r ∉ p.Acquired) THEN
600          t.UnsafelyReleased = t.UnsafelyReleased ∪ { r };
610      }
620      t.Released = t.Released ∪ s;
630      WHILE ((P ≠ NIL) AND (p.Acquired ⊆ t.Released)) {
640        t.Released = t.Released – p.Acquired;
650        p = p.Parent;
```

Listing 1 -continued

```
660        t.Current = p;
670      }
680      t.Held = t.Held – s;
690      IF (t.Held == Ø) THEN
700        t.UnsafelyReleased = Ø;
710    }
720  }
```

Figure 4A:
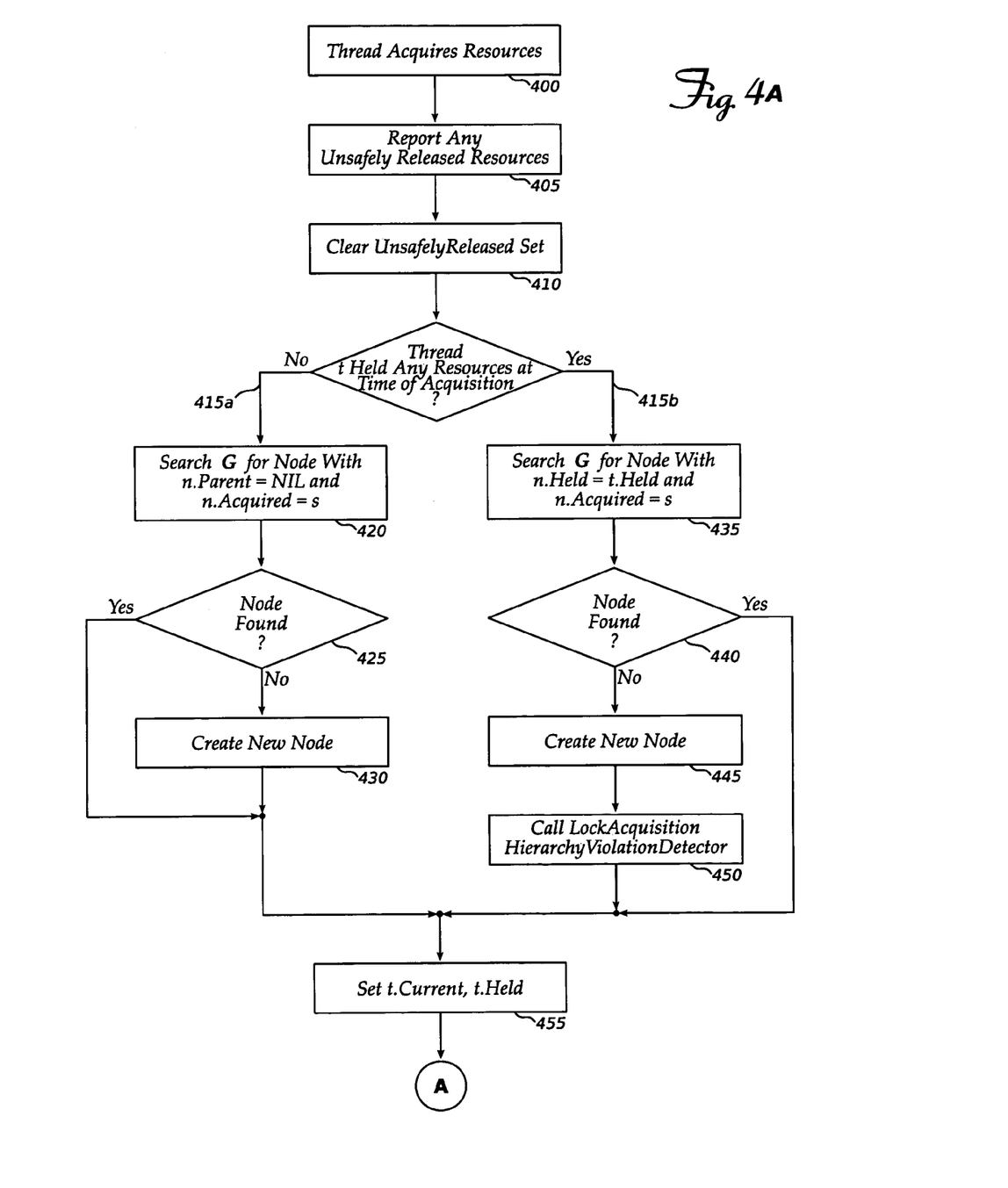
FIGS. 4A and 4B are flow charts of the maintenance of a graph structure.

FIG. 4A outlines a first part of the algorithm implemented by Listing 1 in less formal language. As the instrumented program executes, synchronization operations are monitored by an embodiment of the invention. When a thread t acquires a set of resources s (400), any resources that are present in t.UnsafelyReleased are reported (405), then t.UnsafelyReleased is cleared (410).

If t held no resources when it acquired s (415a), then the embodiment searches the graph of synchronization primitive acquisitions, G, for a node n with no parent that reflects thread t's current resource acquisition (n.Acquired=s) (420). If no such node is found (425), one is created (430). t.Current is updated to point to the found (or created) node and t.Held is updated to include the newly-acquired resources (455). These operations correspond to Listing 1, lines 60-260 and 540.

If t held resources when it acquired s (415b), then the embodiment searches G for a node n among t.Current's children whose Held set equals t's Held set, and whose Acquired set equals s (435). If no such node is found (440), one is created (445). At this point (i.e. only when a thread that holds a set of resources, acquires a second set, and no existing node in the graph represents the acquisition), the LockAcquisitionHierarchyViolationDetector subroutine is invoked (450). The operation of this subroutine is described below. Then, t.Current is updated to point to the found (or created) node and t.Held is updated to include the newly-acquired resources s (455). These operations correspond to Listing 1, lines 280-540.

Figure 4B:
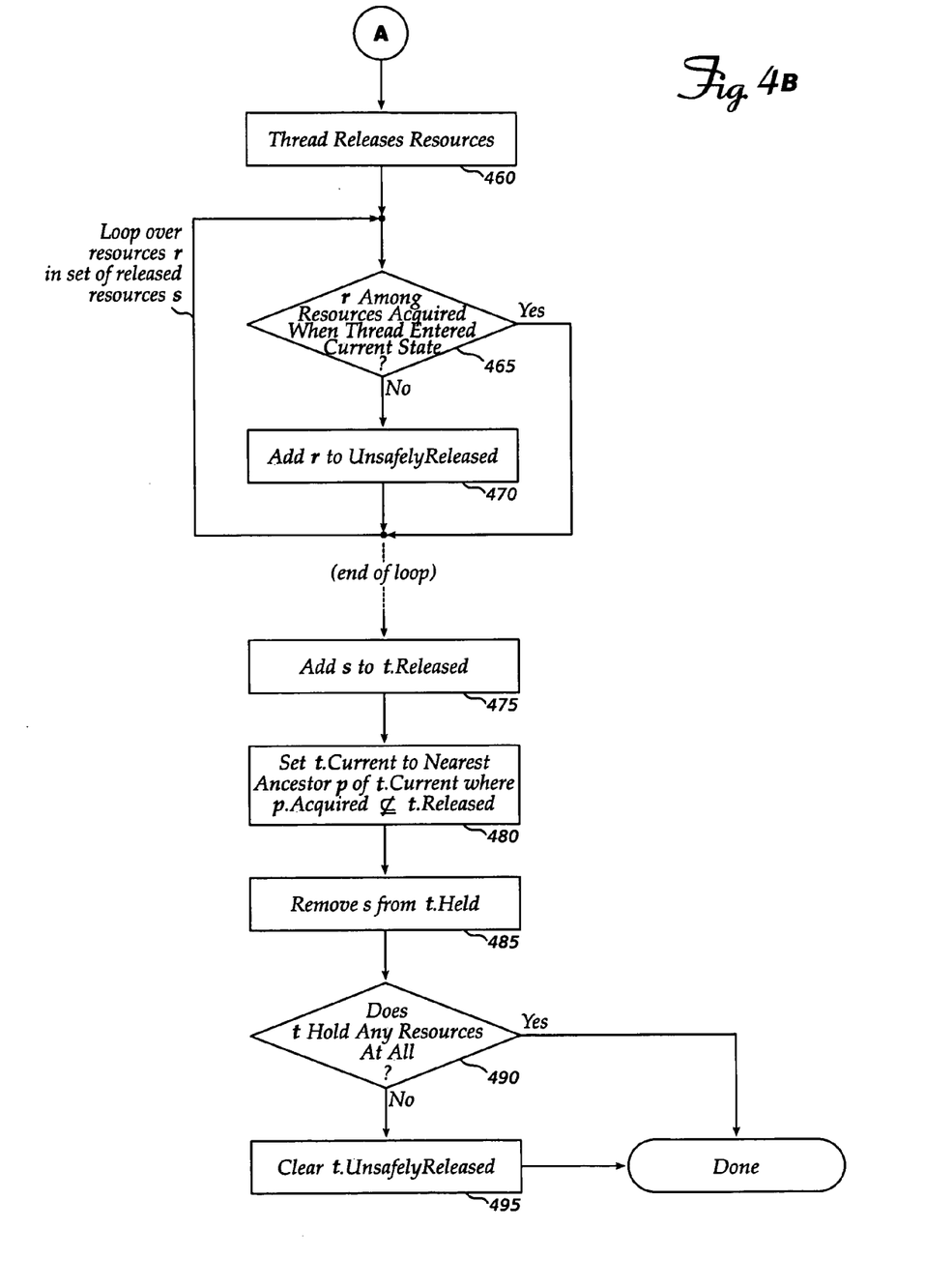

FIG. 4B outlines a second part of the algorithm implemented by Listing 1, lines 570-700. These operations are performed when instrumented code has been detected releasing a set of resources (460). For each resource r in the released resource set s, if r was not among the resources acquired by t on entry to the current synchronization state (465), then r may have been unsafely released and is added to the UnsafelyReleased set (470). It may be reported later, as described in paragraph [0029]. All the released resources in are also added to t.Released (475). Thread t's Current state is updated to point to (a) t.Current itself if the Acquired set of t.Current is not a subset of t.Released; (b) the nearest ancestor of t.Current whose Acquired set is not a subset of t.Released, or (c) nil if no such ancestor is found (480). The released resources s are removed from t.Held (485), and finally, if t has released all the resources it held (490), the UnsafelyReleased set is cleared (495) in recognition of the fact that it is never an error to release all the resources held by a thread.

Note that searching through G to find an existing node before creating a new node to represent a resource acquisition (Listing 1, lines 90-120 and 300-350), and backtracking a thread's synchronization state when a resource release is performed (lines 630-670) allows re-use of previously-created nodes. This may reduce an embodiment's system resource (memory) usage, and may also decrease the amount of processing required to update and analyze the graph when a new state is encountered.

Figure 5:
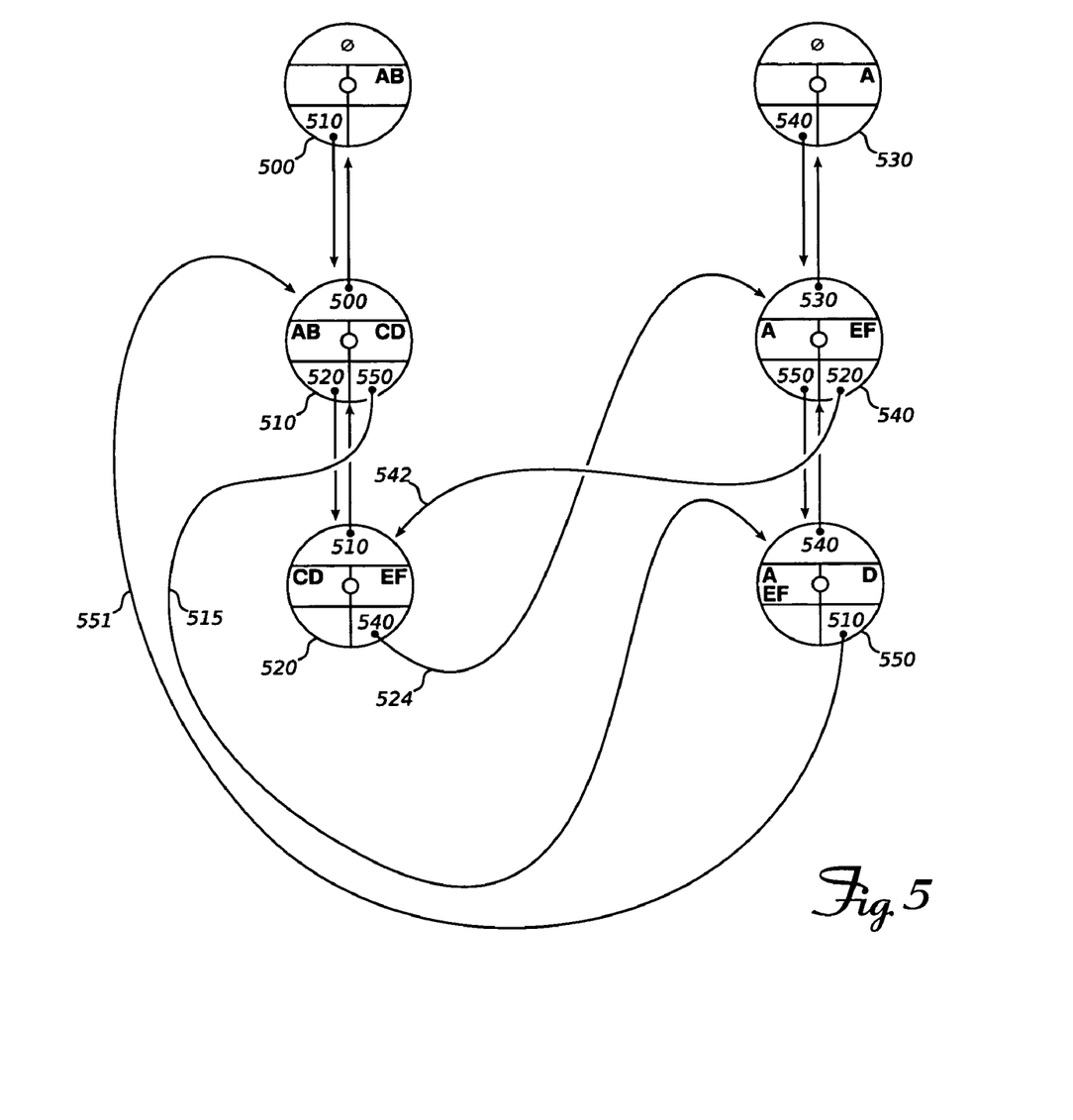
FIG. 5 shows an example graph structure that may be constructed by an embodiment of the invention monitoring the operation of the threads shown in FIG. 1.

FIG. 5 shows a sample graph G that might be constructed during the execution of threads 1 and 2 as shown in FIG. 1. Recall from that figure that Thread 1 executes Acquire(A,B); Acquire(C,D); Release(A); Release(B); Acquire(E,F); Release(C); Release(E); Release(F); Release(D). In this sequence, Acquire(A,B) results in the creation of node 500. Acquire(C,D) results in the creation of node 510, which is connected to node 500 via parent and child links (shown but not marked in FIG. 5). Release(A) and Release(B) cause A and B to be added to Thread 1's UnsafelyReleased set, and they will be reported as possibly unsafe when Thread 1 acquires E and F (see Listing 1, lines 30 and 40). When Thread 1 acquires E and F, node 520 is added to G.

Thread 2 executes Acquire(A); Acquire(E,F); Acquire(D); Release(A); Release(D); Release(E); Release(F). Acquire(A) gives rise to node 530. Acquire(E,F) results in node 540. Through the graph maintenance operations described in [0026] and implemented in Listing 1 at lines 430 through 490, Cross links 524 and 542 are established between nodes 520 and 540. (The graph maintenance operations operate the same regardless of which thread runs first; if Thread 2 had caused the creation of node 540 before Thread 1 executed Acquire (E,F) and caused the creation of node 520, the same Cross links would nonetheless be established when node 520 came into existence.)

Finally, when Thread 2 does Acquire(D), node 550 is created, and Cross links 515, 551 are established between nodes 510 and 550. When graph G is in this state, the LockAcquisitionHierarchyViolationDetector subroutine called after a new node is created and linked (at line 500 of Listing 1) will detect the cycle of nodes 510→520→540→550→510 and report a lock acquisition hierarchy violation.

LockAcquisitionHierarchyViolationDetector detects cycles by calling DetectLockAcquisitionHierarchyViolation, which runs recursively searching for a cycle ($v_{(0,0)}$, $v_{(0,1)}, \ldots, v_{(0,m_0)}; v_{(1,0)}, v_{(1,1)}, \ldots, v_{(1,m_1)}; v_{(2,0)}, v_{(2,1)}, \ldots, v_{(2,m_2)}; v_{(i,0)}, v_{(i,1)}, \ldots, v_{(i,m_i)}; v_{(n,0)}, v(V_{n,1}), \ldots, v_{(n,m_n)}; v_{(0,0)}$) satisfying the following conditions:

1) $v_{(0,0)}$=u (the new node)
2) for any $i \in (0,n)$ and $j \in (1,m)$, $v_{(i,j)}=v_{(i,(j-1))}$.Parent
3) for any $i \in (0,n-1)$, $v_{(0,m_i)}$ has a Cross link to $v_{((i+1),0)}$
4) for any $i \in (0,n)$, $j \in (0,n)$, and $i \neq j$, $v_{(i,0)}$.Held $\cap v_{(j,0)}$.Held=Ø
5) for any $i \in (0, n-1)$, $v_{((i+1),0)}$.Acquired $\cap v_{(i,m_i)}$.Acquired $\cap (v_{(i,0)}$.Held$-v_{(i,1)}$.Acquired$-v_{(i,2)}$.Acquired$- \ldots -v_{(i,(m_i-1))}$.Acquired)$\neq$Ø; and
6) $v_{(n,m_n)}$ has a Cross link to $v_{(0,0)}$ If one or more cycles satisfying the preceding conditions are found, embodiments of the invention report a corresponding number of lock acquisition hierarchy violations. The following pseudo-code shows one way that a search may be performed on the graph G constructed as described above.

Listing 2

```
10   LockAcquisitionHierazchyViolationDetector (node new_node)
20   {
30     create set s0 = Ø;
40     CALL DetectLockAcquisitionHierarchyViolation( s0,
                                                    new_node,
                                                    new_node );
50   }
60
70   DetectLockAcquisitionHierarchyViolation(set s0,node from,node
       to)
80   {
90     create set s1 = from.Held;
100    node ancestor = from.Parent;
110    s0 = s0 ∪ from.Held;
120    WHILE (ancestor ≠ NIL AND s1 ≠ Ø) DO {
130      IF (ancestor.Acquired ∩ s1 ≠ Ø) THEN {
140        FOR (each node cross in ancestor.Cross) DO {
150          IF (cross.Mark ≠ MARKED) THEN {
160            IF (cross.Acquired∩ancestor.Acquired∩s1 ≠ Ø)
                 THEN {
170              IF (cross == to) THEN
180                report lock acquisition hierarchy violation;
190              ELSE {
200                IF (cross.Held ∩ s0 == Ø) THEN {
210                  cross.Mark = MARKED;
220                  CALL
                       DetectLockAcquisitionHierarchyViolation
                       (s0, cross, to);
230                  cross.Mark = UNMARKED;
240                }
250              }
260            }
270          }
280        }
290        s1 = s1 - ancestor.Acquired;
300      }
310      ancestor.Mark = MARKED;
320      ancestor = ancestor.Parent;
330    }
340    s0 = s0 - from.Held;
350    ancestor = from.Parent;
360    WHILE (ancestor ≠ NIL AND ancestor.Mark == MARKED)
         DO {
370      ancestor.Mark = UNMARKED;
380      ancestor = ancestor.Parent;
390    }
400  }
```

Figure 6A:
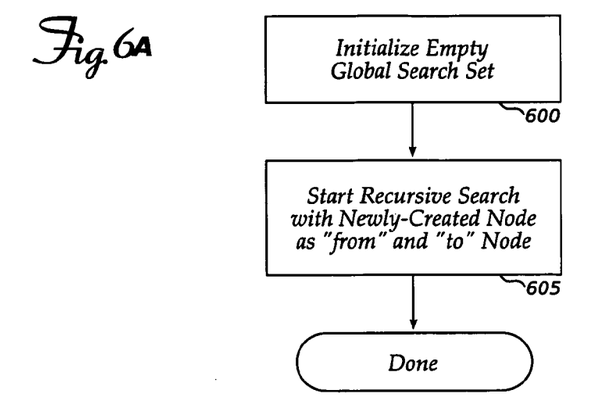
FIGS. 6A, 6B and 6C are flow charts of a graph analysis according to an embodiment of the invention.
Figure 6B:
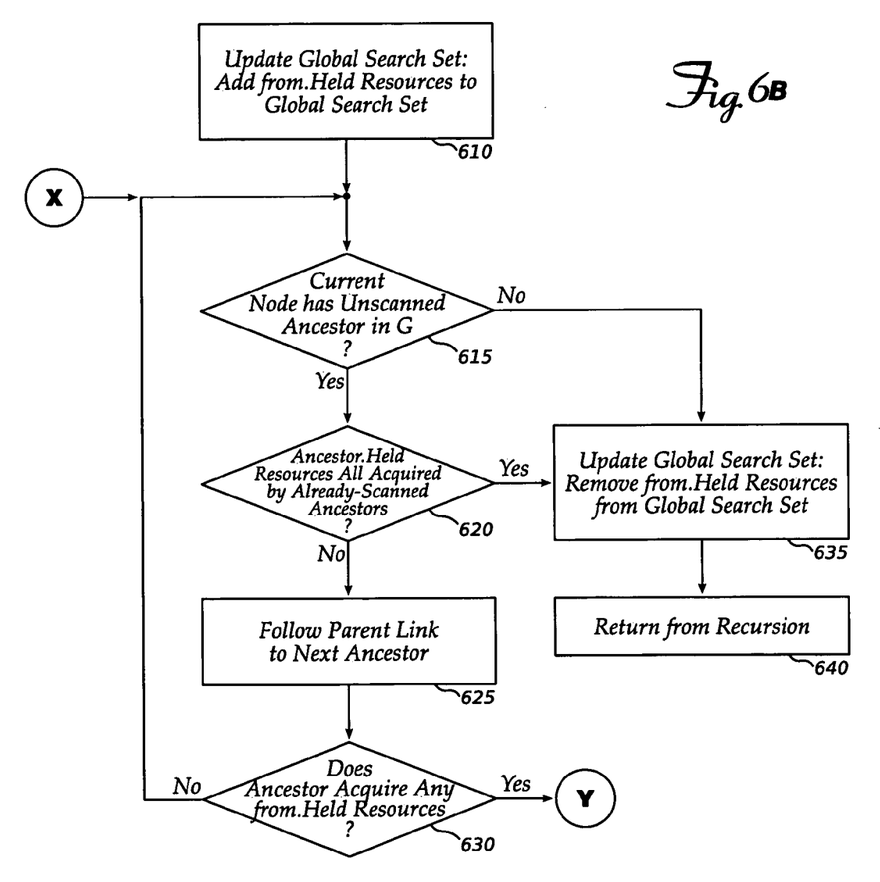
Figure 6C:
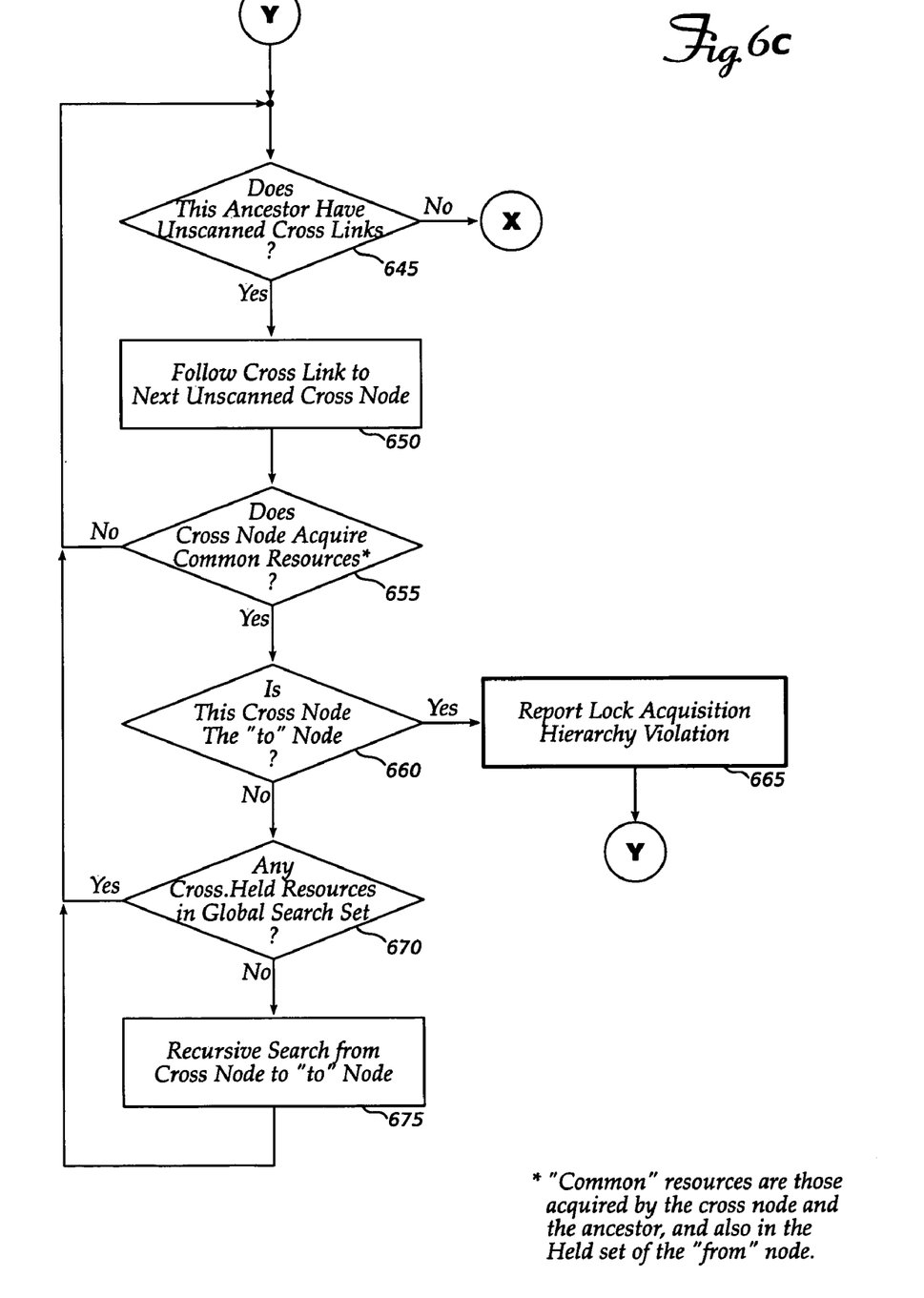

FIGS. 6A, 6B and 6C explain the operation of the graph analysis algorithm implemented by Listing 2. Since the algorithm is recursive, representation in a flow chart is somewhat complex; these figures omit several details that are shown in Listing 2 for the sake of clarity. In essence, the algorithm searches for paths from a node through one or more parent-linked nodes and cross-linked nodes and back to the node itself. The recursion divides the problem into smaller sub-problems, attempting to find a path from a first "from" node to a second "to" node (on entry to the first recursive level, "from" and "to" are simply the newly-created node itself).

FIG. 6A covers the short recursion setup routine at lines 10 through 50. This routine is called with the newly-created node, and it simply initializes a global search set (600) and calls the main routine to look for a path from the newly-created node to the newly-created node (605).

FIG. 6B covers a first portion of the main recursive routine. First, the global search set is updated by adding the Held resources of the from node (610). Now, beginning with the parent of the from node, if the node ("ancestor") is nil (indicating no unscanned ancestors) (615), or all the Held resources were acquired by already-scanned ancestors (620), the Held resources of the j from node are removed from the global search set (635) and the recursion call returns (640). Otherwise, there is more work to do: the current node's Parent link is followed to the next ancestor (625), and the next ancestor is examined to determine whether it represents the acquisition of any of the from.Held resources (630). If the ancestor does not represent the acquisition of any of the from.Held resources, the embodiment returns to 615 to continue with further ancestors.

If the ancestor does represent the acquisition of any from.Held resources, processing continues at FIG. 6C: the ancestor is checked for unscanned Cross links (645). If there are none, processing continues at FIG. 6B, 615. Otherwise, the next unscanned Cross link is followed (650) and the Cross node is examined to see whether crossAcquired, ancestor.Acquired, and from.Held have any common resources (655). If there are no common resources, the next unscanned Cross link is examined. If there are common resources, cross is compared with to: if they are the same (660), the algorithm has found a path from to, so there is a cycle in G and a lock acquisition hierarchy violation must be reported (665).

Otherwise, if cross.Held has no resources in common with the global search set (670), the algorithm calls itself recursively to seek a path from the cross node to the to node (675). When the recursive call returns, or if cross.Held has resources in common with the global search set, the embodiment continues to examine the next unscanned Cross link.

Figure 7:
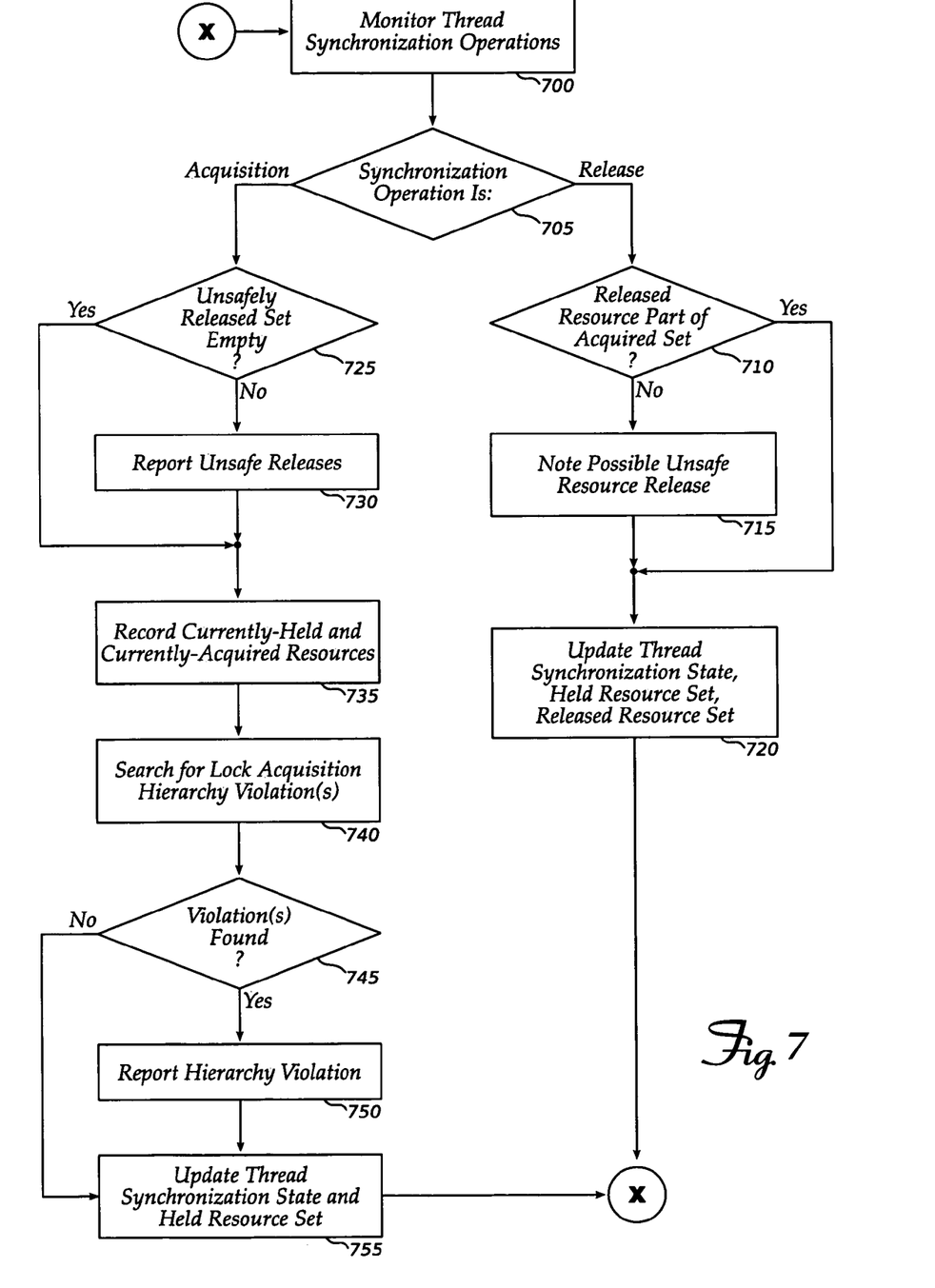
FIG. 7 explains the operation of some embodiments of the invention.

FIG. 7 explains in less formal terms what the construction and analysis of graph G accomplish. As the instrumented multithreaded program executes, an embodiment of the invention monitors thread synchronization operations (700). If a resource release is detected (705) and the released resource is not part of the set of resources acquired upon entry to the thread's current synchronization state (710), then a possible unsafe resource release is noted (715). The thread's synchronization state, held resource set and released resource set are updated (720) and the embodiment continues to monitor further synchronization operations (700).

If a resource acquisition is performed and one or more synchronization objects are acquired (705), the embodiment checks the set of possibly unsafely released resources (725), and any resources in the set are reported as unsafely released (730). Next, the thread's currently-held and currently-acquired resources are recorded (735), and the embodiment searches the collected data for lock acquisition hierarchy violations (740). If any violations are found (745), they will be reported (750). The embodiment updates thread synchronization state and held resource set (755) and will continue to monitor thread operations (700).

When synchronization primitive acquisitions are recorded (e.g. when nodes are added to G) an embodiment may record additional information in (or connected with) the data structure. For example, an identifier of the thread whose synchronization object acquisition caused the node to be created may assist a developer in tracking down a synchronization error. Storing an instruction pointer may permit an embodiment to identify an object-code location or even a source-code location of the synchronization operation. Although the embodiments described above do not collect much information about released resources, a thread identifier, time, and/or instruction pointer may be recorded when a synchronization resource is added to a thread's UnsafelyReleased set, so that more detailed messages about possible or actual unsafe releases can be produced.

Note that embodiments of the invention deal with synchronization object acquisitions and releases in terms of sets of objects. However, some thread execution environments do not provide facilities to acquire or release a plurality of objects atomically. For example, the Portable Operating System Interface for uniX ("POSIX") standard published by the Institute of Electrical and Electronics Engineers ("IEEE") as standard number 1003.1 (various versions and publication dates exist) defines a thread environment that lacks both acquire-multiple and release-multiple operations. Several versions of the Windows® operating system by the Microsoft Corporation of Redmond, Wash., provide an acquire-multiple function via the WaitForMultipleObjects( ) operating system call, but lack release-multiple functionality. In these environments, synchronization object acquisitions and releases may be processed and analyzed by embodiments of the invention as sets containing only a single element. However, the methods apply equally well to thread execution environments that provide both acquire-multiple and release-multiple functions.

Figure 8:
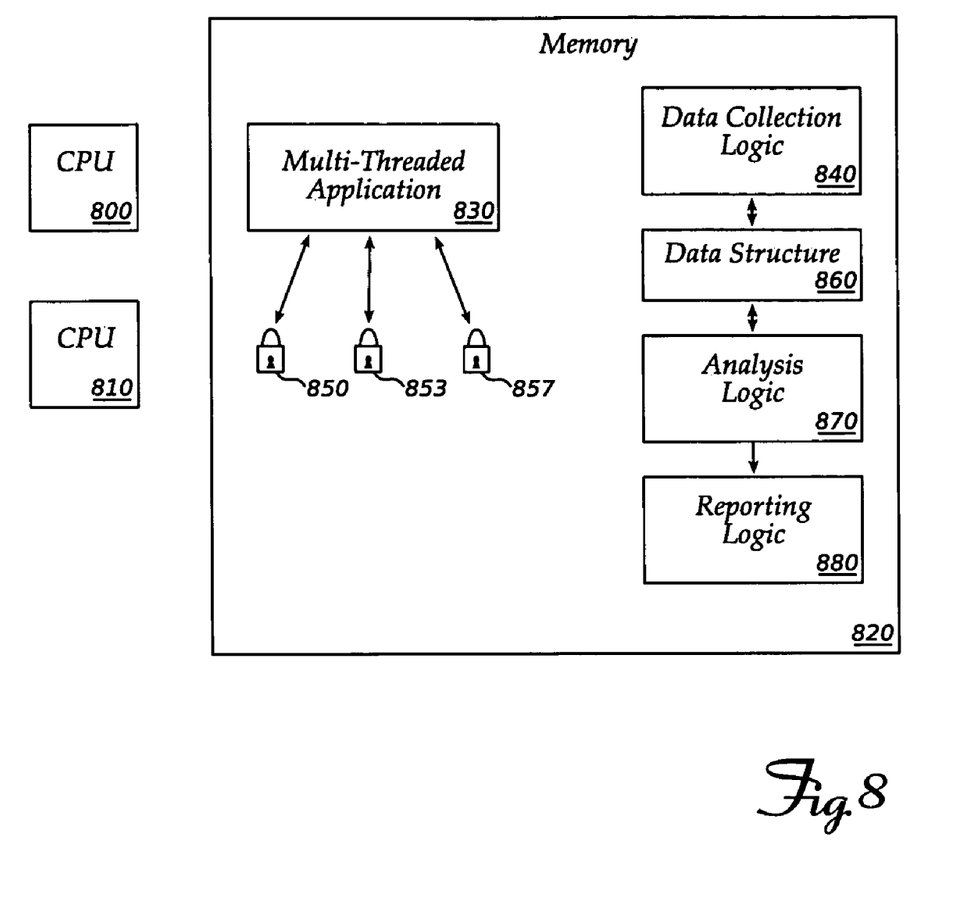
FIG. 8 shows a system that can implement an embodiment of the invention.

FIG. 8 shows a system that can benefit from an embodiment of the invention. This system includes two central processing units ("CPUs") 800 and 810, and a memory 820 containing a multithreaded program 830. Multithreaded programs are often used on multiprocessor machines, although single processor machines can execute such programs and emulate concurrently-executing threads via time slicing. Note particularly that embodiments of the invention detect synchronization errors logically rather than empirically, so testing a multithreaded program on a single-processor machine will detect the same lock acquisition hierarchy violations as testing the program on a multiprocessor machine.

An embodiment of the invention will include data collection logic 840 to collect information about synchronization operations of program 830 (that is, to monitor the program's use of synchronization objects 850, 853, 857 (represented here as "lock" icons). The collected information may be stored in memory 820, for example in a data structure 860. Analysis logic 870 is used to examine the collected information as described in the preceding paragraphs, pseudo-code listings and figures, and detects unsafe lock releases and lock acquisition hierarchy violations that may occur during the execution of program 830. Finally, reporting logic 880 emits a warning about any violations detected by analysis logic 870.

An embodiment of the invention may be a machine-readable medium having stored thereon instructions which cause a processor to perform operations as described above. For example, a software development environment including tools such as a text editor, a compiler, a library manager, a link editor, and a debugger may permit the user to prepare an instrumented version of a multi-threaded program, execute the program and exercise its functions, and review reported lock acquisition hierarchy violation messages. In other embodiments, individual development tools may implement portions of the functionality described. Embodiments may be distributed as binary (executable) programs, as source code to prepare such executables, or as source code changes ("diffs") to permit an end user to modify the source code of a commonly-available application so that the application performs methods according to an embodiment.

An embodiment may contain hardware components that perform some or all of the data collection and analysis functions described. Software and/or hardware to implement an embodiment of the invention may be used on a generic or special-purpose computer system containing one or more central processing units ("CPUs" or "processors"), memory, and optional auxiliary devices such as a keyboard, video display, or network communication interface.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that detection of lock acquisition hierarchy violations and unsafe lock releases in a multi-threaded program can also be produced by software and hardware that distribute the functions of embodiments of this invention differently than herein described. Such variations and implementations are understood to be captured according to the following claims.

I claim:

1. A method comprising:
   for a first thread which acquires a synchronization primitive, recording a set of currently-held synchronization primitives and a set of currently-acquired synchronization primitives;
   indicating a possibly-unsafe lock release when the first thread releases a resource set s of resource set elements r and one or more of the resource set elements r of the resource set s was not among a plurality of resource set elements acquired by the first thread on entry to the synchronization primitive previously acquired by the first thread;
   constructing a graph of connected nodes, where a node indicates the set of currently-held synchronization primitives and the set of currently-acquired synchronization primitives;
   searching the graph for a node to indicate the set of currently-held synchronization primitives and the set of currently-acquired synchronization primitives; and
   searching for a lock acquisition hierarchy violation, in which a second thread acquires a partial acquisition hierarchy of the synchronization primitive previously acquired by the first thread, wherein searching for a lock acquisition hierarchy violation comprises searching for a cycle in the graph;
   reporting the lock acquisition hierarchy violation; and
   reporting the possibly-unsafe lock release.

2. The method of claim 1, wherein reporting the unsafe lock release comprises reporting the unsafe lock release when the first thread acquires a second synchronization primitive while the first thread is holding the synchronization primitive previously acquired in which the one or more of the resource set elements r of the resource set s was not among the plurality of resource set elements acquired by the first thread on entry to the synchronization primitive previously acquired by the first thread.

3. The method of claim 2, further comprising: updating the current synchronization state of the first thread.

4. The method of claim 1, further comprising:
   creating a new node if the searching operation returns no node.

5. The method of claim 1 wherein a cardinality of the set of currently-acquired synchronization primitives is one.

6. The method of claim 1, further comprising:
   recording at least one of a thread identifier, a time, or an instruction pointer when the first thread or the second thread acquires a synchronization primitive.

7. A non-transitory computer-readable medium having instructions stored thereon to cause a programmable machine to perform operations comprising:
   for a first thread which acquires a synchronization primitive, recording a set of currently-held synchronization primitives and a set of currently-acquired synchronization primitives;
   indicating a possibly-unsafe lock release when the first thread releases a resource set s of resource set elements r and one or more of the resource set elements r of the resource set s was not among a plurality of resource set elements acquired by the first thread on entry to the synchronization primitive previously acquired by the first thread;
   constructing a graph of connected nodes, where a node indicates the set of currently-held synchronization primitives and the set of currently-acquired synchronization primitives;
   searching the graph for a node to indicate the set of currently-held synchronization primitives and the set of currently-acquired synchronization primitives; and
   searching for a lock acquisition hierarchy violation, in which a second thread acquires a partial acquisition hierarchy of the synchronization primitive previously acquired by the first thread, wherein searching for a lock acquisition hierarchy violation comprises searching for a cycle in the graph;
   reporting the lock acquisition hierarchy violation; and
   reporting the possibly-unsafe lock release.

8. The non-transitory computer-readable medium of claim 7, wherein reporting the unsafe lock release comprises reporting the unsafe lock release when the first thread acquires a second synchronization primitive while the first thread is holding the synchronization primitive previously acquired in which the one or more of the resource set elements r of the resource set s was not among the plurality of resource set elements acquired by the first thread on entry to the synchronization primitive previously acquired by the first thread.

9. The non-transitory computer-readable medium of claim 7:
   wherein constructing the graph of connected nodes comprises:
      building a data structure to represent operations for a plurality of threads of a multi-threaded program associated with the synchronization primitive acquired by the first thread; and
   wherein the non-transitory computer-readable medium includes additional instructions to cause the programmable machine to perform operations further comprising:
      adding a node to the data structure for each one of the plurality of threads that acquires a synchronization primitive, and
      reusing the node when one of the plurality of threads acquires the first set of synchronization primitives while holding a second set of synchronization primitives within the partial acquisition hierarchy acquired by the second thread.

10. The non-transitory computer-readable medium of claim 7, containing additional instructions to cause the programmable machine to perform further operations comprising:
   maintaining an association between each of the first thread and the second thread and a corresponding node of the data structure.

11. The non-transitory computer-readable medium of claim 7, wherein reporting the unsafe lock release comprises reporting the unsafe lock release when the first thread acquires a second synchronization primitive while the first thread is holding the synchronization primitive previously acquired in which the one or more of the resource set elements r of the resource set s was not among the plurality of resource set elements acquired by the first thread on entry to the synchronization primitive previously acquired by the first thread.

12. The non-transitory computer-readable medium of claim 7, containing additional instructions to cause the programmable machine to perform further operations comprising:
   instrumenting a multi-threaded program to monitor synchronization primitive operations of a plurality of threads of the program by introducing code into the program or into libraries utilized by the program, or both.

13. A system comprising:
a plurality of processors;
a multi-threaded program;
data collection logic to collect information about synchronization operations of the program; analysis logic to examine the information and detect a first thread which acquires a synchronization primitive;
reporting logic to record a set of currently-held synchronization primitives and a set of currently-acquired synchronization primitives based on the detected first thread;
wherein the analysis logic to further indicate a possibly-unsafe lock release when the first thread releases a resource set s of resource set elements r and one or more of the resource set elements r of the resource set s was not among a plurality of resource set elements acquired by the first thread on entry to the synchronization primitive previously acquired by the first thread;
wherein the analysis logic to further construct a graph of connected nodes, where a node indicates the set of currently-held synchronization primitives and the set of currently-acquired synchronization primitives;
wherein the analysis logic to further search the graph for a node to indicate the set of currently-held synchronization primitives and the set of currently-acquired synchronization primitives;
wherein the analysis logic to further search for a lock acquisition hierarchy violation, in which a second thread acquires a partial acquisition hierarchy of the synchronization primitive previously acquired by the first thread, wherein the search for a lock acquisition hierarchy violation comprises a search for a cycle in the graph; and
wherein the reporting logic to further report the lock acquisition hierarchy violation and report the possibly-unsafe lock release.

14. The system of claim 13 wherein the analysis logic to further indicate a possibly-unsafe lock release comprises the analysis logic to further emit a warning about the potentially unsafe lock release when the first thread acquires a second synchronization primitive while the first thread is holding the synchronization primitive previously acquired in which the one or more of the resource set elements r of the resource set s was not among the plurality of resource set elements acquired by the first thread on entry to the synchronization primitive previously acquired by the first thread.

15. The system of claim 13:
wherein the analysis logic to construct the graph of connected nodes comprises the analysis logic to: build a data structure to represent operations for a plurality of threads of a multi-threaded program associated with the synchronization primitive acquired by the first thread; and
wherein the analysis logic is to further:
add a node to the data structure for each one of the plurality of threads that acquires a synchronization primitive.

16. The system of claim 15 wherein the data collection logic re-uses a node in the data structure when one of the plurality of threads acquires the first set of synchronization primitives while holding a second set of synchronization primitives within the partial acquisition hierarchy acquired by the second thread.

17. The system of claim 13 wherein the reporting logic is to identify at least one of a thread, an object location, or a source code location associated with the lock acquisition hierarchy violation.

18. The system of claim 13 wherein the analysis logic detects the lock acquisition hierarchy violation when the multi-threaded program operates normally and runs to completion by executing without deadlock.

* * * * *